(12) United States Patent
Jia et al.

(10) Patent No.: US 8,898,199 B2
(45) Date of Patent: Nov. 25, 2014

(54) DISTRIBUTED MANAGEMENT MONITORING SYSTEM, MONITORING METHOD AND CREATING METHOD THEREOF

(75) Inventors: Xiaoqiang Jia, Shenzhen (CN); Xueming Dong, Shenzhen (CN); Chunming Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 107 days.

(21) Appl. No.: 13/258,273

(22) PCT Filed: May 6, 2010

(86) PCT No.: PCT/CN2010/072497
§ 371 (c)(1),
(2), (4) Date: Sep. 21, 2011

(87) PCT Pub. No.: WO2011/003296
PCT Pub. Date: Jan. 13, 2011

(65) Prior Publication Data
US 2012/0102072 A1    Apr. 26, 2012

(30) Foreign Application Priority Data
Jul. 7, 2009    (CN) .......................... 2009 1 0088684

(51) Int. Cl.
G06F 17/30    (2006.01)
G06F 15/16    (2006.01)
H04L 12/24    (2006.01)
(52) U.S. Cl.
CPC ........ *H04L 41/042* (2013.01); *G06F 17/30197* (2013.01); *H04L 41/22* (2013.01)
USPC .......................................... 707/802; 709/201
(58) Field of Classification Search
None
See application file for complete search history.

(56) References Cited

U.S. PATENT DOCUMENTS 5,724,512 A    3/1998    Winterbottom
5,809,527 A *  9/1998    Cooper et al. ................ 711/133
(Continued)

FOREIGN PATENT DOCUMENTS

CN    101051962 A    10/2007
CN    101197736 A    6/2008
(Continued)

OTHER PUBLICATIONS

The Design of VIP-FS : A Virtual, Parallel File System for High Performance Parallel and Distributed Computing.
(Continued)

Primary Examiner — Tarek Chbouki
(74) Attorney, Agent, or Firm — Oppedahl Patent Law Firm LLC (57)    ABSTRACT

The present disclosure discloses a method for creating a distributed management monitoring system to create a distributed management monitoring system based on a distributed file system. Moreover, the present disclosure further discloses a monitoring method of the distributed management monitoring system, the method includes: updating a file of recording monitoring information regularly and correspondingly updating a device descriptor table by a sub-file system of the distributed management monitoring system; updating the device descriptor table and informing a server to update a file descriptor table by the sub-file system; and finding a device descriptor table corresponding to a designated network element through traversing the file descriptor table and reading a designated file according to the device descriptor table by the server. Accordingly, the present disclosure provides a distributed management monitoring system, the system includes: a server, a file descriptor table and a sub-file system. Therefore, by utilizing the present disclosure, each network element is enabled to monitor itself independently, unnecessary communications among network elements are reduced, and the stability of the distributed management monitoring system is enhanced.

2 Claims, 3 Drawing Sheets

(56) References Cited

U.S. PATENT DOCUMENTS

| | | | |
|---|---|---|---|
| 5,946,685 A * | 8/1999 | Cramer et al. | 1/1 |
| 6,026,440 A | 2/2000 | Shrader et al. | |
| 6,324,581 B1 * | 11/2001 | Xu et al. | 709/229 |
| 6,405,237 B1 * | 6/2002 | Khalidi et al. | 709/203 |
| 6,546,415 B1 | 4/2003 | Park | |
| 6,665,267 B1 * | 12/2003 | Iwasaki et al. | 370/241 |
| 6,973,455 B1 * | 12/2005 | Vahalia et al. | 1/1 |
| 7,120,631 B1 * | 10/2006 | Vahalia et al. | 1/1 |
| 7,272,613 B2 * | 9/2007 | Sim et al. | 709/223 |
| 7,810,133 B2 * | 10/2010 | Carter et al. | 726/2 |
| 8,095,577 B1 * | 1/2012 | Faibish et al. | 707/823 |
| 8,533,295 B2 * | 9/2013 | Soltis | 709/219 |
| 2002/0133491 A1 * | 9/2002 | Sim et al. | 707/10 |
| 2005/0193023 A1 * | 9/2005 | Ismail | 707/200 |
| 2005/0288939 A1 * | 12/2005 | Peled et al. | 705/1 |
| 2007/0094354 A1 * | 4/2007 | Soltis | 709/218 |
| 2007/0255677 A1 | 11/2007 | Alexander et al. | |
| 2008/0168561 A1 * | 7/2008 | Durie et al. | 726/23 |
| 2008/0267406 A1 * | 10/2008 | Asokan et al. | 380/277 |
| 2009/0133001 A1 * | 5/2009 | Rozenfeld | 717/127 |
| 2010/0235413 A1 * | 9/2010 | Patel et al. | 707/825 |
| 2011/0023025 A1 * | 1/2011 | Eldering | 718/1 |
| 2011/0035502 A1 * | 2/2011 | Boyd | 709/227 |
| 2012/0198479 A1 * | 8/2012 | Jann et al. | 719/318 |
| 2013/0104191 A1 * | 4/2013 | Peled et al. | 726/1 |

FOREIGN PATENT DOCUMENTS

| | | |
|---|---|---|
| CN | 101316199 A | 12/2008 |
| CN | 101621405 A | 1/2010 |
| EP | 0738970 A1 | 10/1996 |
| EP | 1052805 A2 | 11/2000 |
| JP | 07334445 A | 12/1995 |
| JP | 09114722 A | 5/1997 |
| JP | 11331188 A | 11/1999 |
| JP | 11353145 A | 12/1999 |
| JP | 2001005758 A | 1/2001 |
| JP | 2001331458 A | 11/2001 |
| JP | 2006179014 A | 7/2006 |
| JP | 2008511259 A | 4/2008 |
| KR | 20020090206 A | 11/2002 |

OTHER PUBLICATIONS

International Search Report in international application No. PCT/CN2010/072497, mailed on Aug. 5, 2010.

English Translation of the Written Opinion of the International Search Authority in international application No. PCT/CN2010/072497, mailed on Aug. 5, 2010.

Supplementary European Search Report in European application No. 10796673.1, mailed on Mar. 16, 2012.

* cited by examiner

DISTRIBUTED MANAGEMENT MONITORING SYSTEM, MONITORING METHOD AND CREATING METHOD THEREOF

TECHNICAL FIELD

The present disclosure relates to the field of a communication monitoring technology, and more particularly, to a distribute management monitoring system and the monitoring method and creating method thereof.

BACKGROUND

With the increasing demands on network, communication services develop rapidly, communication networks become more and more complicated, and an increasing number of network elements are involved in a communication system. Moreover, the increasing demands of network operators on 40G services, higher-speed services and the like lead to an increasing complexity in networking, therefore, the number of network elements to need to be managed is increasing rapidly to result in an increasing difficulty in the management of network elements.

However, whether each network element is able to run normally and stably is closely related to the vital interests of the users. As a result, a whole monitoring system is required to be capable of reflecting the running condition of a single board in a network element more rapidly while running normally, and realizing real-time report and real-time monitoring. However, there is a lack of monitoring means for network elements at present, and existing monitoring systems also have some deficiencies, such as, the system for monitoring the communication subsystems in and among the network elements of a Wavelength Division Multiplexing (WDM) device is a centralized monitoring system, which still focuses on centralized report. The monitoring system has the problems of slow performance inquiry, untimely alarm report, no uniform log management, discrete monitoring results, heavy communications among network elements and the like, which not only reduces the efficiency of system maintenance, but also results in instability in the monitoring system. In addition, existing monitoring systems also are incapable of performing an inter-platform monitoring, and existing network element monitoring methods have been far from meeting current demands.

SUMMARY

In view of the above problems, it is the main purpose of the present disclosure to provide a distributed management monitoring system and a monitoring method and creating method thereof, so as to enable each network element to monitor itself independently, reduce unnecessary communications among network elements, and enhance the stability of the distributed management monitoring system.

In order to achieve the purpose above, the present disclosure discloses a method for creating a distributed management monitoring system, comprising: creating and initializing a file descriptor table and a monitoring platform of a distributed management monitoring system based on a distributed file system; creating and initializing a Virtual File System (VFS) and a root file system of the distributed management monitoring system, and mounting the root file system on the VFS; correspondingly mounting each network element on the VFS according to a file system type of each network element; and creating and initializing a device descriptor table, and correspondingly updating the file descriptor table.

In the foregoing method, the step of creating and initializing the monitoring platform of a distributed management monitoring system based on a distributed file system may comprise: initializing a server of the distributed management monitoring system; embedding a sub-file system in a network element to be mounted on the distributed management monitoring system to enable the network element to interact with the server; and creating a mapping management link from a local sub-file system to the server and providing an interface for reading and writing a file in the sub-file system by the network element through loading a client_server system.

Wherein the step of mounting each network element on the VFS according to the file system type of each network element may comprise: determining whether a mounting point corresponding to the file system type of the network element to be mounted exists on the current VFS directory tree, if a mounting point exists, mounting the network element to be mounted on the distributed management monitoring system; if a corresponding initial mounting point does not exist, adding the mounting point of the network element in the VFS according to the file system type of the network element and mounting the network element on the distributed management monitoring system.

In the foregoing method, the step of creating and initializing a device descriptor table and correspondingly updating the file descriptor table may comprise: the information of a single board in a network element is synchronously updated to a corresponding device descriptor table, and after being informed of the updating of the device descriptor table, the server of the distributed management monitoring system adds the information of a newly-added network element in the file descriptor table and establishes an index link of the device descriptor table of the newly-added network element; wherein the file descriptor table is an index from the server to the sub-file system.

Accordingly, the present disclosure further discloses a method monitoring of a distributed management monitoring system, comprising: updating a file of recording monitoring information regularly and correspondingly updating a device descriptor table by a sub-file system of the distributed management monitoring system; updating the device descriptor table and informing a server to update a file descriptor table by the sub-file system; and finding a device descriptor table corresponding to a designated network element through traversing the file descriptor table by the server, and reading a designated file according to the device descriptor table by the server.

Wherein the step of updating a file of recording monitoring information regularly and correspondingly updating a device descriptor table by the distributed management monitoring system may comprise: each network element correspondingly writes, via the sub-file system, the various collected information into a file to be traversed by the server and synchronously modify a data field pointer in the device descriptor table. The step of finding a device descriptor table corresponding to a designated network element through traversing the file descriptor table of the server and reading a designated file according to the device descriptor table by the server may comprise: after receiving a monitoring instruction, the server determines whether the monitoring instruction is legal, if the monitoring instruction is illegal, the server returns a response message to a primary control network manager to inform the primary control network manager that the monitoring instruction is illegal and then stops the current monitoring operation;

if the monitoring instruction is legal, the server permits the monitoring request of the primary control network manager, finds the device descriptor table of a specific network element designated by the primary control network manager through traversing the file descriptor table, and thereby finds and reads a designated file.

In order to achieve the above method, the present disclosure provides a distributed management monitoring system, comprising: a server, a file descriptor table and a sub-file system; wherein the server is configured to update a file descriptor table and finding a device descriptor table corresponding to a network element designated by a monitoring instruction through traversing the file descriptor table; the file descriptor table may be used for searching for the device descriptor table corresponding to the designated network element according to the monitoring instruction received by the server; and the sub-file system may be used for updating a file of recording monitoring information regularly and correspondingly updating the device descriptor table; the sub-file system further comprises: a device descriptor table for mapping a file recording the monitoring information of each network element thereinto and reading a designated file according to the monitoring instruction.

Wherein the distributed management monitoring system may further comprise: a primary control network manager for sending a monitoring instruction to the server; and the server is specifically configured to: determine whether the monitoring instruction is legal after receiving the monitoring instruction, when the monitoring instruction is illegal, return a response message to a primary control network manager, inform the primary control network manager that the monitoring instruction is illegal, and then stop the current monitoring operation; and when the monitoring instruction is legal, permit the monitoring request of the primary control network manager, find the device descriptor table of a specific network element designated by the primary control network manager through traversing the file descriptor table, and thereby find and read the designated file.

In the above distributed management monitoring system, the sub-file system is specifically configured to: accordingly write the various collected information by each network element through the sub-file system into a file to be traversed by the server, and synchronously modify the data field pointer in the device descriptor table by each network element.

It can be seen from the technical solution above that, the present disclosure introduces a Distributed File System (DFS) in a monitoring system, and each network element supporting the distributed file system can monitor and manage itself independently, i.e., a distributed management is realized. That is, each network element acts as a manager; the existing monitoring systems have a great amount of information that is reported conventionally, however, the distributed management monitoring system provided in the present disclosure directly writes monitoring information in a local sub-file system of a network element, that is, directly writes the information used to be reported in a device descriptor table corresponding to a network element. When a primary control network manager, such as a Graphical User Interface (GUI) primary control network manager, inquires the internal information of a designated network element, such as the performance information of a single board, a root file system finds a corresponding device descriptor table through traversing a file descriptor table, and a sub-file system reads and reports a designated file content according to the device descriptor table. Therefore, the unnecessary communications among network elements are reduced and both of the communication speed and the communication performance are improved.

Additionally, the present disclosure is compatible with the existing centralized management mode for network elements, and realizes a centralized management and a distributed management for network elements, so that the existing management mode in which a manager monitors all network elements is converted to a management mode in which each network elements in the present disclosure manages itself independently, that is, for monitoring a single network element, the distributed management monitoring system in the present disclosure can act as a single manager for monitoring a single network element; for monitoring multiple network elements, multiple managers, i.e. multiple network elements, monitor independently in the present disclosure. Wherein monitoring multiple network elements makes the present disclosure more outstanding, as a large amount of bandwidth waste is caused by network rolling messages in the existing network element monitoring methods. The management mode of each network element for managing itself independently is achieved by the distributed management monitoring system in the present disclosure, which not only reduces communications among network elements, and saves the internal bandwidth of a communication system, but also realizes a load balance in a monitoring management device and system, and enhances the stability of a network monitoring system.

Moreover, the distributed management monitoring system provided in the present disclosure is a monitoring system unrelated with a specific device, since the present disclosure enables, by introducing a distributed file system into a network element monitoring system, a network element supporting the distributed file system, that is, a network element embedded with a sub-file system, to monitor and manage the network element per se independent from the specific bottom devices, such as the structure of the network element, the number of single boards and the like, of the network element, thus it not only can realize to uniformly and conveniently manage the network elements, but also can timely and accurately monitor and process the default of the communication system. Accordingly, the present disclosure establishes a device-unrelated distributed management monitoring system mechanism, i.e., establishes a monitoring connection in which a type of a WDM system and a framework type need not to be distinguished or even different companies are involved, therefore, the sub-frameworks of the network elements in the distributed management monitoring system supporting the distributed file system are allowed to be used in a mixed manner, and it is certainly optimal that there is uniform back board design and routing standard for the sub-frameworks. Wherein the sub-framework can be construed to as a set of single boards. In this way, the network element monitoring method of the present disclosure realizes an inter-platform monitoring, which not only provides a method for the interconnection of devices of different manufacturers, but also reduces monitoring cost.

It can be seen that, the present disclosure not only realizes a distributed management on the increasing network elements, but also greatly improves the communication speed and performance of a communication system, enhances the stability of the monitoring system, and realizes a uniform inter-platform monitoring.

DETAILED DESCRIPTION

The basic idea of the present disclosure lies in that: network elements are introduced in a distributed file system to establish a distributed management monitoring system, and a file descriptor table and a device descriptor table are established to enable each network element supporting the distributed file system to monitor and manage the network element per se independently to thereby realize a distributed management on network elements.

It should be noted that, the distributed management monitoring system refers to a monitoring system which introduces a distributed file system into network elements and performs a distributed management on the network elements. Here, the Distributed File System (DFS) refers to a network server based on a client-server mode and comprises a server for the access of multiple users. Wherein by means of the distributed file system, network data are easily found and managed; moreover, the files in the distributed file system can be stored at different locations in a network, and a single hierarchical multi-file client and server can be established in the network. Moreover, the distributed file system, which is not limited to a single file protocol, is capable of supporting a mapping to a server, sharing and file. The mapping is not limited by a file client being used as long as the file client supports a local server and sharing.

Figure 1:
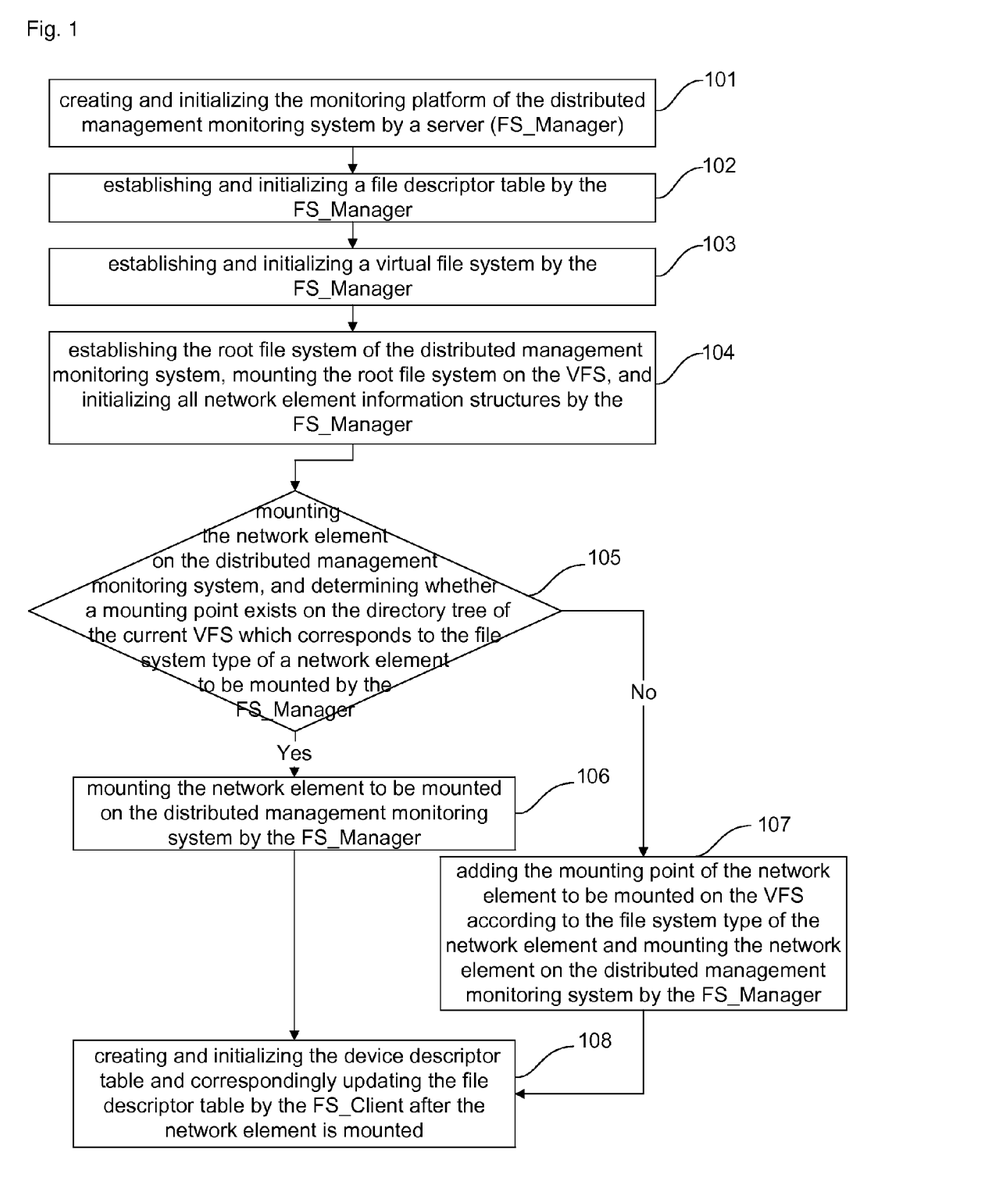
FIG. 1 is a schematic diagram illustrating the flow of a method for creating a distributed management monitoring system according to the present disclosure.

In order to provide a better understanding of the above purposes, features and advantages of the present disclosure, the present disclosure is further described below in detail in combination with accompanying drawings and specific embodiments. FIG. 1 shows the progress of the creation of a distributed management monitoring system and the loading of a network element according to the present disclosure; as shown in FIG. 1, the process comprises the following steps that:

step 101: a server (FS_Manager) creates and initializes a monitoring platform of a distributed management monitoring system;

in this embodiment, the distributed management monitoring system organizes the monitoring information files on each network element together in the form of a tree-shaped structure, that is, creates a directory tree which comprises a server (FS_Manager) and a client. Consequently, in order to realize the support of a network element to the distributed management monitoring system, the FS_Manager embeds, based on the distributed file system, a sub-file system FS_Client in the distributed management monitoring system in a network element to be monitored and managed so as to realize an interaction with the network element; here, the client refers to a network element embedded with the sub-file system FS_Client. Wherein each network element has a corresponding FS_Client, which takes charge of the monitoring and management of the network element and creates a file recording the information of all the single boards in the network element and the like and a device descriptor table synchronous with the file; however, the FS_Manager monitors and manages all FS_Clients, corresponding to a file server of the FS_Clients, and is configured with a file descriptor table corresponding to a device descriptor table that can be mapped to a specific network element; actually, as a software function module, the FS_Client provides an interface for an interaction with the FS_Manager so as to mount a network element on the distributed management system; in addition, in order to support the distributed management monitoring system, the network element further needs to be loaded a Client_Server system, and creates a mapping management link from a local FS_Client to the FS_Manager and provides an interface for the FS_Manager, network elements and the like to read and write FS_Client files through the Client_Server system;

in this step, creating and initializing the monitoring platform of the distributed management monitoring system based on a distributed file system is mainly to initialize the server (FS_Manager) by calling an FS_Manager initialization function, such as a root_dfs_init function, provided by the distributed management monitoring system, and creat the monitoring platform of the distributed management monitoring system based on a distributed file system; wherein the distributed management monitoring system provides multiple functions, such as a file descriptor table initialization function dfs_fd_init, a virtual file system initialization function root_vfs_init, a root file system mounting function mount_root, a network element mounting function mount_dev, a device descriptor table initialization function dev_ds_init and the like, for the distributed management monitoring system to call; moreover, the distributed file system as well as a database system and various monitoring data structure are initialized during the process of introducing the distributed file system; wherein the distributed file system is used for providing a management interface for the FS_Manager; the database system is used for recording the historical information that the whole distributed management monitoring system needs to record, for example, recording the abnormal information and the normal information of a network element and the monitoring setting information set by the primary control network manager for a certain network element; wherein the various monitoring data structures refer to the core management structure of the distributed management monitoring system; here, initializing the distributed file system comprises initializing a directory structure, a connection point and the like; initializing the database system comprises: initializing a log data structure and initializing the information such as the setting of a network element and the like by the primary control network manager; and initializing the various monitoring data structures comprises initializing structures of network element information, alarm information, performance information and configuration information;

it should be noted that, the distributed management monitoring system takes charge of monitoring whether a transmission system in a communication system runs normally and whether each single board runs normally; each network element has a corresponding FS_Client, and the FS_Manager manages all the FS_Clients, corresponding to a file server of the FS_Clients; thus, by accessing an FS_Manager of a shared distributed file system, the primary control network manager can access a file or folder of an FS_Client mounted on the FS_Manager; wherein the primary control network manager refers to a monitoring management interface located on a PC machine, which is capable of interacting with a user, and obtains the condition of each network element mounted on the distributed management monitoring system by accessing the FS_Manager;

step 102: the FS_Manager establishes and initializes a file descriptor table;

in the step, the file descriptor table refers to an index from the FS_Manager to an FS_Client, that is, a linked list for mapping the FS_Manager to a specific device descriptor table; after the monitoring platform of the distributed management monitoring system is initialized, the file descriptor table also is established and initialized, which is mainly realized by calling a file descriptor initialization function dfs_fd_init; initializing the file descriptor table mainly comprises: initializing data structure of the file descriptor table, initializing an index link corresponding to the device descriptor table and the like; it should be noted that, the initialization of the file descriptor table and the initialization of the distributed management monitoring system may be performed synchronously;

wherein the file descriptor table structure comprises: the basic information of the device descriptor table, such as the byte size and the type number of the device descriptor table, the Internet Protocol (IP) address, the name and the data field pointer of a corresponding device, devices adjacent to the device and the like; wherein the file descriptor table of the corresponding device is found based on the IP address, i.e., the network element IP address, of the corresponding device, and the data field pointer in the file descriptor table is synchronously updated after the information in the device descriptor table is updated; a specific file descriptor table structure may be understood with reference to the following example:

```
struct _FILE_DCESCRIPTOR_STRUCT{
    BYTE blength;          //the size of the number of bytes of a
    device descriptor table
    BYTE bDescriptorType;           //the type number of a device
    descriptor table
    DWORD dwDevIp;        //the IP address of a corresponding device
    BYTE   *bName;         //the name of the corresponding device
    void *bDeviceDataArea;          //a data field pointer
    WORD wDeviceComm Protocol;   //a communication protocol
supported by the device
    struct _DEVICE_DCESCRIPTOR_STRUCT *pNextDevFD;
    //a device ahead
    struct _DEVICE_DCESCRIPTOR_STRUCT *pNextDevFD;
    //a device behind
    ...
    ...
    };
``` here, the device descriptor table contains the structure information, the performance information and the alarm information of all the single boards in an FS_Client and the inherent information of each single board such as the type of the single board, the function of the single board and the like; then, the FS_Manager finds out a corresponding device descriptor table through traversing the file descriptor table and searches for a file recording the information of a corresponding single board via the device descriptor table; moreover, the device descriptor table may perform an update regularly according to a specific monitoring demand, for example, the device descriptor table updates the corresponding performance information in a performance-recording file every 15 minutes if a performance inquiry is performed every 15 minutes;

step 103: the FS_Manager establishes and initializes a Virtual File System (VFS);

Wherein the VFS is an interface for the interaction between an upper layer application and a bottom file system, therefore, in order to facilitate the interaction between the FS_Manager and the FS_Client, the VFS is established when the distributed management monitoring system is created; specifically, by calling a VFS initialization function such as a root_vfs_init ( ) function, the directory tree of the VFS is established and a corresponding data structure on the directory tree of the VFS is initialized; the corresponding data structure refers to a mounting linked list on the directory tree, for example, a linked list formed by the mounting points of various FS_Clients;

additionally, initializing the VFS means instantiating the file system types of various network elements to form a linked list, that is, providing mounting points for network elements of different file system types on the directory tree of the VFS according to the file system types of the various network elements; this is because the types of the file systems of the monitored network elements may be different, the types of the file systems including FAT, ext2, ext3 and the like; therefore, in order to mount network elements of different file system types, the VFS may set default mounting points for the file system types of the network elements to be mounted while being initialized; when a network element of a new file system type is mounted, a mounting point corresponding to the file system type is added to be mounted for the network element of the new file system type;

step 104: the FS_Manager establishes a root file system of the distributed management monitoring system, mounts the root file system on the VFS, and initializes all network element information structures;

in the step, the FS_Manager establishes a root file system of the distributed management monitoring system, mounts the root file system by calling a root file system mounting function such as a mount_root ( ) function, i.e., mounts the root file system on the VFS, and initializes the network element information structures of the distributed management monitoring system; here, the root file system corresponds to a mounting point of a corresponding default file system type; thus, instructions, such as the file operation instruction initiated by the VFS and the like, called by the primary control network manager via the distributed management monitoring system are taken over by a corresponding function interface in the root file system, for instance, that the read instruction vfs_read of the VFS actually calls is the read function root_read of the root file system; wherein initializing all network element information structures comprises: initializing file structures such as monitoring performance, alarm, event and the like and a pointer device; here, initializing the network information structure is actually initializing the empty linked list of the network element to provide an interface for mounting a network element; moreover, initializing file structures, such as performance, alarm, event and the like, is to provide an interface for correspondingly recording the information of a network element in the linked list and the file structure during the following network element mounting, for example, recording the name and file system type of an FS_Client corresponding to a network element, the information of all the single boards in the network element into the file descriptor table by taking the initialized network element information structure as the original board;

here, the FS_Manager is configured with a file descriptor table of the same grade, which is a linked list mapped to the device descriptor table of a specific network element, that is, the file descriptor table is linked with the IP address of a device descriptor table to realize an index from the FS_Manager to an FS_Client, thereby providing a fast retrieval approach; thus, by accessing an FS_Manager of a shared distributed file system, the primary control network manager can access a file or folder of an FS_Client mounted on the FS_Manager;

step 105: the FS_Manager mounts the network element on the distributed management monitoring system and determines whether a mounting point exists on the directory tree of the current VFS which corresponds to the file system type of a network element to be mounted, if a mounting point exists, executing step 106; if a corresponding initial mounting point does not exist, executing step 107;

step 106: the FS_Manager mounts the network element to be mounted on the distributed management monitoring system and then executing Step 108;

in the step, the network element is added to a corresponding mounting point on the directory tree of the VFS in the distributed management monitoring system according to the file system type of the network element to be mounted; moreover, an FS_Client based on the FS_Manager is embedded in the network element to be mounted that monitors and manages the network element per se through the FS_Client; wherein a file for recording the information of all single boards in a corresponding network element and a device descriptor table synchronous with the file are created in the FS_Client; the network element or the upper layer application finds, via the device descriptor table, the location of a file designated by itself to read and write the designated file; here, the file comprises various performance files, alarm files, and configuration files which are used for recording the inherent information of a single board, such as the type of a single board, the function of a single board and the like; moreover, the file is classified according to the recorded information type, for instance, alarm information is recorded in an alarm file, and performance information is recorded in a performance file; the information of all the single boards in the network element are synchronized into the device descriptor table of the FS_Client, which contains the information of all the single boards in the network element, such as structure, performance, alarm, inherent information and the like;

wherein all the network elements are mounted on the mounting points on the directory tree of the VFS of the distributed management monitoring system through calling a network element mounting function, such as a Mount_device (unsigned int IP_Address); hence, the operation conducted by the FS_Manager on a certain mounting point on the directory tree of the VFS may be converted to a corresponding operation on a specific FS_Client mounted on the mounting point, for instance, the VFS modifies or creates a file via a vfs_write which calls the write operation of the FS_Client;

step 107: the FS_Manager adds the mounting point of the network element to be mounted on the VFS corresponding to the file system type of the network element to be mounted and mounts the network element on the distributed management monitoring system;

here, when a network element of a new file system type is added, the FS_Manager mounts the newly-added network element in the distributed management system, that is, an index node (iNODE) is added in the form of a binary tree in the VFS, and the iNODE correspondly mounted to a network element in the directory tree of the VFS, which is managed by an FS_Client based on the FS_Manager in the iNODE; and step 108: the FS_Client creates and initializes the device descriptor table and correspondingly updates the file descriptor table after the network element is mounted;

the device descriptor table is an information mapping table of all the single boards in a network element, therefore, when a network element is mounted on the directory tree of the VFS, the FS_Manager informs the FS_Client to create and initialize the device descriptor table of the network element, that is, to map the network element into the device descriptor table; wherein initializing the device descriptor table by calling a device descriptor table initialization function, such as a dev_ds_init (unsigned int Ip_Address) function, mainly means mapping the device descriptor table to a specific network element, that is, the information of all the single boards in the network element may be synchronized to the device descriptor table of the FS_Client, and the mapping from each network element to the FS_Manager is initialized;

it should be noted that, the device descriptor table structure comprises: the basic information of a device, such as device identifier (ID), device manufacturer ID and the like, an IP address link of a managing device, the name of a corresponding device, a data field pointer, the communication protocols supported by a device, a data block reader-writer and the like; wherein the IP address link of a managing device refers to the IP addresses of the single boards in the network element, and finding a designated file with the device descriptor table means finding, according to the IP address of an internal single board recorded by a corresponding device file descriptor table, a file location corresponding to the single board with a data file pointer; moreover, the data field pointer in the file descriptor table is synchronously updated after the information in the device descriptor table is updated; a specific device descriptor table structure may be understood with reference to the following example:

```
struct _DEVICE_DCESCRIPTOR_STRUCT{
    BYTE bDevID;              //device ID
    BYTE bDescriptorTypeID;   //device manufacturer ID
    struct DevlpTable *dlDevlp;  //the IP address link of a managing device
    BYTE *bName;              // the name of a corresponding device
    void *bDeviceDataArea;    //data field pointer
    WORD wDeviceCommProtocol; //a communication protocol provided by a device
    struct super_block *(*rw_super) (struct super_block *, void *, int);  //data block reader-writer
    ...
    ...
};
``` in addition, as there is a need of finding a device descriptor table corresponding to the IP address of a designated network element by traversing the file descriptor table to read a file content at a designated location, after the device descriptor table is updated, the FS_Client may inform the FS_Manager to update the file descriptor table, that is, the FS_Manager adds the information of the newly-added network element in the file descriptor table and adds the index link of the device descriptor table of the newly-added network element by calling an update_fd function to establish a mapping from the mounted network element to the FS_Manager, that is, a link between the device descriptor table and the file descriptor table; for instance, if desiring to report performance information, a single board first reports the performance information to a network element, and then the network element writes the reported performance information into a corresponding file in the FS_Client and synchronously updates the performance information into the device descriptor table; moreover, the FS_Client may inform the FS_Manager to update a data field pointer in the file descriptor table when a file is written or updated, so that the FS_Manager can find a corresponding file when inquiring a file recording the information of a designated single board; for instance, when the storage location of the performance file of a designated single board is found via the device descriptor table, the performance content reported by the single board is written via the write function, such as a d_write function, of the distributed management monitoring system; it should be noted that, the device descriptor table contains information, such as structure, performance, alarm and inherent information, of all the single boards in the network element.

Figure 2:
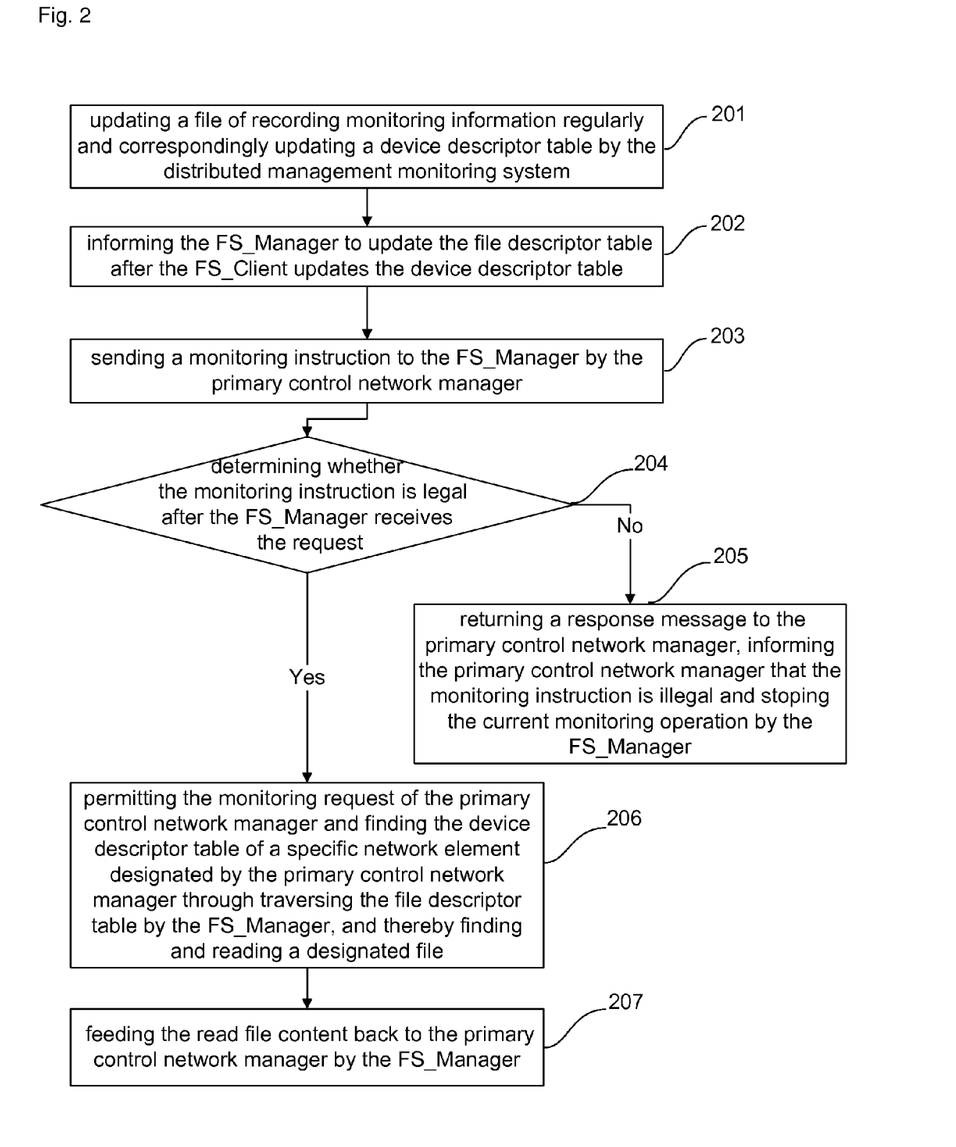
FIG. 2 is a schematic diagram illustrating the flow of a monitoring method of a distributed management monitoring system according to the present disclosure.

Till here, the process of the creation of a distributed management monitoring system provided in the present disclosure and the loading of a network element is described in the above embodiment, and the realization flow of a monitoring method of a distributed management monitoring system provided in the present disclosure is described below with reference to FIG. 2, as shown in FIG. 2, the realization flow comprises the following steps:

step 201: updating a file of recording monitoring information regularly and correspondingly updating a device descriptor table by the distributed management monitoring system;

Wherein the file of recording monitoring information is a file of an FS_Client which records various information of a monitored network element, and each network element takes charge of collecting its own internal information, such as the alarm information and the performance information of a single board, correspondingly writes the various collected information into a file, such as a file descriptor table, for the traverse of the FS_Manager via the FS_Client, and synchronously updates the collected information to the device descriptor table; for instance, if desiring to report 15-minute performance information, a single board reports the performance information to a network element, and then the network element writes and stores the reported 15-minute performance information via the FS_Client in a local 15-minute performance file;

step 202: informing the FS_Manager to update the file descriptor table after the FS_Client updates the device descriptor table;

in the step, the FS_Client reports each file update to the FS_Manager and informs the FS_Manager to update the file descriptor table synchronously; here, the FS_Client is configured with a Dynamic Link File (DLF) for indicating a change in a file in the current FS_Client, such as the addition or deletion of a file; once detecting a file change, the DFL informs the FS_Manager to update related information in the file descriptor table, for example, the location of a newly-added file, the IP of the network element to which the FS_Manager belongs, the size of the file and the like; after updating the file descriptor table, the FS_Manager further determines whether to report the performance information or alarm information for an update to the primary control network manager; wherein after the file is updated, the FS_Manager is informed of the file update mainly in the following two ways, i.e., a regular inquiry by the FS_Manager and an active report from the FS_Client; the FS_Manager can check a real-time change in a file through polling, for instance, the application layer of the FS_Manager regularly reads a 15-minute performance file once, that is, every 15 minutes; consequently, the FS_Client shields a great amount of monitoring information that should be reported among network elements and can be monitored in real time;

additionally, the FS_Manager determines whether to report to the primary control network manager according to the information content reported by the FS_Client, wherein the criterion for the FS_Manager to determine whether to report information content varies with the reported information; for more important information, such as alarm information alarming that a single board stops working for having a fault, the FS_Manager may report to the primary control network manager so that the primary control network manager can timely display the alarm information to a user; however, for the ordinary performance information reported, the FS_Manager does not report to the primary control network manager;

step 203: sending a monitoring instruction to the FS_Manager by the primary control network manager;

here, in addition to obtaining the information of each network element from the report of the FS_Manager, the primary control network manager further sends a monitoring instruction to the FS_Manager to obtain the information of a designated network element; wherein the monitoring instruction refers to a monitoring command set by the primary control network element for a specific single board, such as reading the alarm inquiry and the performance inquiry of a designated single board;

step 204: determining whether the monitoring instruction is legal after the FS_Manager receives the request, if the monitoring instruction is illegal, executing step 205; otherwise, executing step 206;

Wherein whether the monitoring instruction is legal usually refers to determining whether the message format of the monitoring instruction is correct or whether the FS_Manager supports the monitoring instruction;

step 205: returning a response message to the primary control network manager, informing the primary control network manager that the monitoring instruction is illegal and stopping the current monitoring operation by the FS_Manager;

step 206: permitting the monitoring request of the primary control network manager and finding the device descriptor table of a specific network element designated by the primary control network manager through traversing the file descriptor table by the FS_Manager, and thereby finding and reading the designated file;

when the monitoring instruction of the primary control network manager is legal, the FS_Manager permits the monitoring request of the primary control network manager and finds corresponding device descriptor table and file descriptor table through traversing the file descriptor table according to the IP address of the network element designated by the primary control network manager, and the FS_Client finds the location of the designated file via the device descriptor table and reads the designated file content; specifically, when the primary control network manager GU is to read a file, for example, to inquire the performance of a certain type of single boards via the FS_Manager, the FS_Manager searches for a corresponding file content in the file descriptor table according to the IP address of a designated file through calling the read function, such as d_read function, of the distributed management monitoring system; for instance, the primary control network manager sends an alarm inquiry monitoring instruction for a specific single board, after receiving an inquiry request message, the FS_Manager finds a corresponding device descriptor table through traversing the file descriptor table, and the FS_Client finds the location of the designated file via the device descriptor table and reads corresponding information items in the designated file through calling read function of the FS_Client per se, for example, finding and reading a corresponding 15-minute performance file if the 15-minute performance of a single board is inquired;

step 207: feeding the read file content back to the primary control network manager by the FS_Manager;

thus, the primary control network manager can access a file or folder of the FS_Client mounted on the FS_Manager just by accessing the FS_Manager, and needs not know the actual physical location of the device descriptor table of the accessed FS_Client during the access; it can be seen from above that, after a distributed management is introduced into the distributed management monitoring system, the single boards in a network element are not directly associated with the FS_Manager any more as each network element acts as a manager; therefore, the information used to be reported conventionally is now directly written in the device descriptor table of the network element per se, when inquiring the information of a designated network element, the primary control network manager can achieve by reading the file descriptor table of the FS_Manager, thus reducing a great number of unnecessary communications among network elements.

In addition, TCP/IP or UDP may be adopted for an information interaction among network elements, however, in order to guarantee the reliability of information transmission and communication, TCP/IP is adopted for the communication between the FS_Manager and the FS_Client in the embodiment.

It should be noted that, by establishing a device-unrelated distributed management monitoring system mechanism, that is, establishing a monitoring connection in which the types and the framework types of WDM systems are not distinguished or even different companies are involved, in the embodiment, the sub-frameworks of the network elements in the distributed management monitoring system are allowed to be used in a mixed manner, and it is certainly optimal that there is uniform back board design and routing design for the sub-frameworks; wherein the sub-framework can be construed to as a set of single boards. Therefore, the embodiment realizes an inter-platform monitoring so that the devices manufactured by different manufacturer can be interconnected and the monitoring cost is reduced.

In view of the above embodiments, for the sake of a simplified description, the above embodiments are each expressed as a set of a series of actions, however, those skilled in the art should know that the present disclosure is not limited by the order of actions described herein, since some steps can be executed in another order or executed simultaneously in accordance with the present disclosure.

Figure 3:
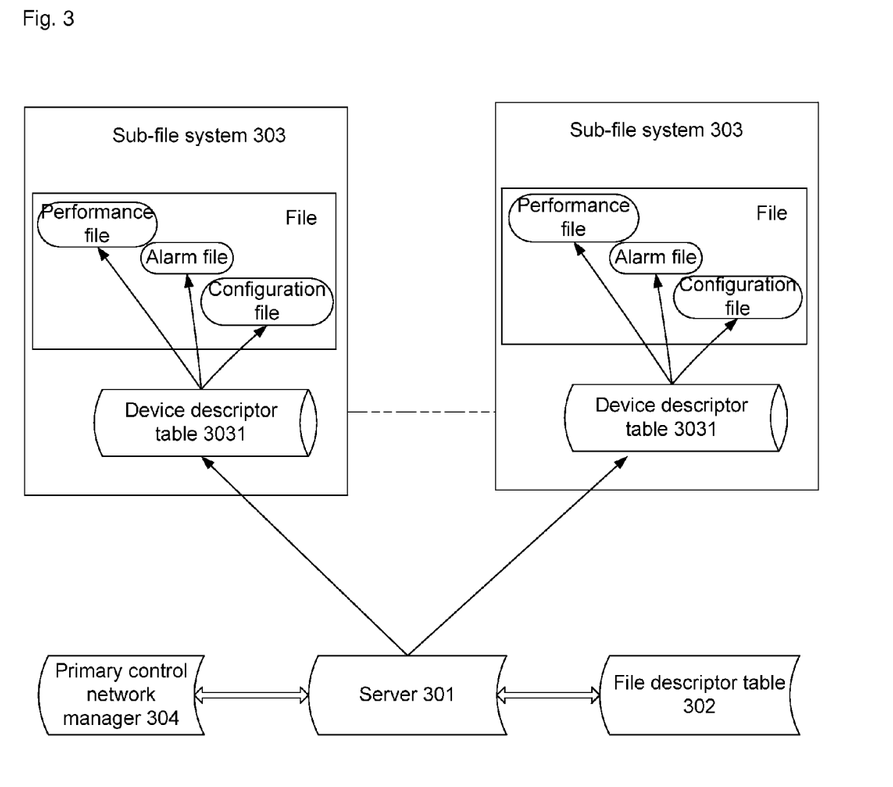
FIG. 3 is a schematic diagram illustrating the structure of a distributed management monitoring system according to the present disclosure.

In order to realize the above methods, the present disclosure further provides a distributed management monitoring system, as shown in FIG. 3, comprising: a server (FS_Manager) 301, a file descriptor table 302, a sub-file system FS_Client 303 and a device descriptor table 3031; wherein the server 301 is used for updating the file descriptor table 302 and finding a device descriptor table 3031 corresponding to a network element designated by a monitoring instruction through traversing the file descriptor table 302;

the file descriptor table 302 is used for searching for the device descriptor table 3031 corresponding to the designated network element according to a monitoring instruction received by the server 301; and the sub-file system 303 is used for updating a file of recording monitoring information regularly and correspondingly updating a device descriptor table;

wherein the sub-file system 303 further comprises: a device descriptor table 3031 for mapping a file recording the monitoring information of each network element and reading a designated file according to the monitoring instruction.

The distributed management monitoring system further comprises: a primary control network manager 304 for sending an instruction to the server 301;

the server 301 is specifically used for determining, after receiving a monitoring instruction of the primary control network manager 304, whether the received monitoring instruction is legal, if not, the server 301 returns a response message to the primary control network manager 304, informs the primary control network manager 304 that the monitoring instruction is illegal and stops the current monitoring operation;

if the received monitoring instruction is legal, the server 301 permits the monitoring request of the primary control network manager 304, finds the device descriptor table 3031 of a specific network element designated by the primary control network manager 304 through traversing the file descriptor table 302 and thereby finds and reads a designated file.

The sub-file system 303 is specifically configured to implement that: each network element correspondingly writes the various collected information via the sub-file system 303 into a file to be traversed by the server 301 and synchronously modifies the data field pointer in the device descriptor table 3031.

The above embodiments are respectively emphasized on certain aspects; the part that is not described in detail in an embodiment can be understood with reference to a corresponding description in another embodiments. The mentioned above are only preferred embodiments of the present disclosure, and are used for describing and explaining the present disclosure but not intended to limit to the protection scope of the present disclosure. Any modifications and equivalent that is made without departing from the spirit of the present disclosure and the protection scope of the appended claims are within the protection scope of the present disclosure.

What is claimed is:

1. A method for remotely monitoring network elements through a monitoring platform, said network elements each including a memory to store a device descriptor table that records local monitoring information about said corresponding network elements, said monitoring platform including a memory to store a file descriptor table that records mappings from the device descriptor tables of said network elements to the monitoring platform, comprising:

initializing a server of the monitoring platform;

embedding a sub-file system in a network element to be mounted on the monitoring platform to enable the network element to interact with the server;

creating a mapping management link from a local sub-file system to the server and providing an interface for reading and writing of a file in the sub-file system by the network element through loading a client server system;

creating and initializing a Virtual File System (VFS) and a root file system of the monitoring platform, and mounting the root file system on the VFS;

correspondingly mounting each network element on the VFS according to a file system type of each network element;

updating, at each of said network elements, the device descriptor table stored in the memory included in the network element, in response to updating of local monitoring information of the network element; and informing the monitoring platform to update the file descriptor table stored in the memory included in the monitoring platform;

receiving, by the monitoring platform, a request from an entity for local monitoring information about a specified network element of said network elements;

determining whether the request is legal;

if the monitoring instruction is illegal, returning a response message to the entity to inform that the monitoring instruction is illegal and then stopping the current monitoring operation; and if the monitoring instruction is legal, retrieving, by the monitoring platform, the file device descriptor table, to obtain a mapping from the monitoring platform to the device descriptor table stored in the memory included in the specified network element;

based on the obtained mapping, retrieving, by the specified network element, the device descriptor table stored in the memory included in the specified network element, to obtain the local monitoring information about the specified network element; and providing, by the monitoring platform, said obtained local monitoring information to said entity.

2. A system for remotely monitoring network elements through a monitoring platform, comprising:

the network elements each including a memory to store corresponding device descriptor tables, each device descriptor table recording local monitoring information about said corresponding network element; and the monitoring platform including a memory to store a file descriptor table recording mappings from the device descriptor tables of said network elements to the monitoring platform, wherein the device descriptor table stored in the memory included in each of said network elements updates in response to updating of local monitoring information of the network element, and the file descriptor table stored in the memory included in the monitoring platform updates with the updating of the device descriptor table stored in the memory included in the network element, wherein the monitoring platform is configured to initialize a server of the monitoring platform; to embed a sub-file system in a network element to be mounted on the monitoring platform to enable the network element to interact with the server; to create and initialize a Virtual File System (VFS) and a root file system of the monitoring platform, and mount the root file system on the VFS; to correspondingly mount each network element on the VFS according to a file system type of each network element;

to receive a request from an entity for local monitoring information about a specified network element of said network elements, and to determine whether the request is legal, if the monitoring instruction is illegal, to return a response message to the entity to inform that the monitoring instruction is illegal and then stop the current monitoring operation, and if the monitoring instruction is legal, to retrieve the file device descriptor table to obtain a mapping from the monitoring platform to the device descriptor table stored in the memory included in the specified network element;

the specified network element is configured to create a mapping management link from a local sub-file system to the server and provide an interface for reading and writing of a file in the sub-file system through loading a client server system;

to based on the obtained mapping, to retrieve the device descriptor table stored in the memory included in the specified network element, to obtain the local monitoring information about the specified network element;

the monitoring platform is further configured to provide said obtained local monitoring information to said entity.

* * * * *